United States Patent
Katariya et al.

(10) Patent No.: US 11,810,174 B1
(45) Date of Patent: Nov. 7, 2023

(54) INDEX SEARCHING WITH NON-EUCLIDEAN REPRESENTATIONS

(71) Applicant: Amazon Technologies, Inc., Reno, NV (US)

(72) Inventors: Sumeet Katariya, Sunnyvale, CA (US); Nikhil S. Rao, San Jose, CA (US); Chandan K. Reddy, Broadlands, VA (US); Karthik Subbian, Palo Alto, CA (US); Nurendra Choudhary, Arlington, VA (US)

(73) Assignee: Amazon Technologies, Inc., Reno, NV (US)

( * ) Notice: Subject to any disclaimer, the term of this patent is extended or adjusted under 35 U.S.C. 154(b) by 407 days.

(21) Appl. No.: 17/219,511

(22) Filed: Mar. 31, 2021

(51) Int. Cl.
 G06Q 30/06 (2023.01)
 G06F 16/9538 (2019.01)
 G06N 20/00 (2019.01)
 G06Q 30/0601 (2023.01)

(52) U.S. Cl.
 CPC ..... *G06Q 30/0623* (2013.01); *G06F 16/9538* (2019.01); *G06N 20/00* (2019.01)

(58) Field of Classification Search
 None
 See application file for complete search history.

(56) References Cited

U.S. PATENT DOCUMENTS

| 11,657,094 B2* | 5/2023 | Moon | G06N 3/049 706/15 |
| 2020/0410012 A1* | 12/2020 | Moon | G06Q 10/04 |
| 2022/0270155 A1* | 8/2022 | Volkovs | G06Q 30/0631 |

OTHER PUBLICATIONS

Muscoloni, A., et al., "Machine learning meets complex networks via coalescent embedding in the hyperbolic space," Nature Communications, DOI:10.1038/s41467-017-10825-5, Nov. 2017. (Year: 2017).*

(Continued)

*Primary Examiner* — Nicholas D Rosen
(74) *Attorney, Agent, or Firm* — Hogan Lovells US LLP

(57) ABSTRACT

Items within an index may be converted from classic geometry and embedded into a hyperbolic space. The hyperboloids within the hyperbolic space provide higher precision classifications of items within the index relative to their hierarchical structure. A received search query may also be converted to hyperbolic space and mapped as a query hyperboloid against an answer space that includes hyperboloids for items within the index. Distances or overlaps between the hyperboloids may be determined in order to generate a set of search results.

20 Claims, 11 Drawing Sheets

(56) References Cited

OTHER PUBLICATIONS

Zhang, M., et al., "Hyper-TransE: Research on Knowledge Representation Learning Based on Hyperbolic Embedding," {Abstract only] Basic and Clinical Pharmacology and Toxicology, 127. Suppl !:35. Blackwell Publishing Ltd. Aug. 2020. (Year: 2020).*

Matsumoto, H., et al., "Novel Metric for hyperbolic Phylogenetic tree embeddings," bioRxiv, https://doi.org/10.1101/20202.1009.334243, Oct. 10, 2020. (Year: 2020).*

Klimovskaia, A., et al., "Poincare maps for analyzing complex hierarchies in single-cell data," Nature Communications, https://doi.org/10.1038/s41467-020-16822-4. 2020. (Year: 2020).*

Choudhary, N., et al., "Self-Supervised Hyperboloid Representations from Logical Queries over Knowledge Graphs," arXiv: 2012.13023v3, May 12, 2021. (Year: 2021).*

Choudhary, N., Self-Supervised Hyberboloid Representations from Logical Queries over Knowledge Graphs; Cornell University, Computer Science (Dec. 2020) https://arxiv.org/pdf/2012.13023.pdf.

* cited by examiner

INDEX SEARCHING WITH NON-EUCLIDEAN REPRESENTATIONS

BACKGROUND

An increasing volume of products and services is being offered electronically, such as through websites provided by online retailers. These retailers often depend on search technology to allow customers to locate various products and services offered by those retailers. If a potential customer is unable to locate an item due to a poor search experience, that customer is likely to look elsewhere and may never return to that particular retailer or website. Products and services may be grouped into hierarchies that use lexical and semantic product information to match queries to various products or services. But user queries are often vague or too short to provide sufficient information, and catalogs of products and services continue to grow, making it more challenging to identify items for users.

BRIEF DESCRIPTION OF THE DRAWINGS

Various embodiments in accordance with the present disclosure will be described with reference to the drawings, in which.

DETAILED DESCRIPTION

Figure 1A:
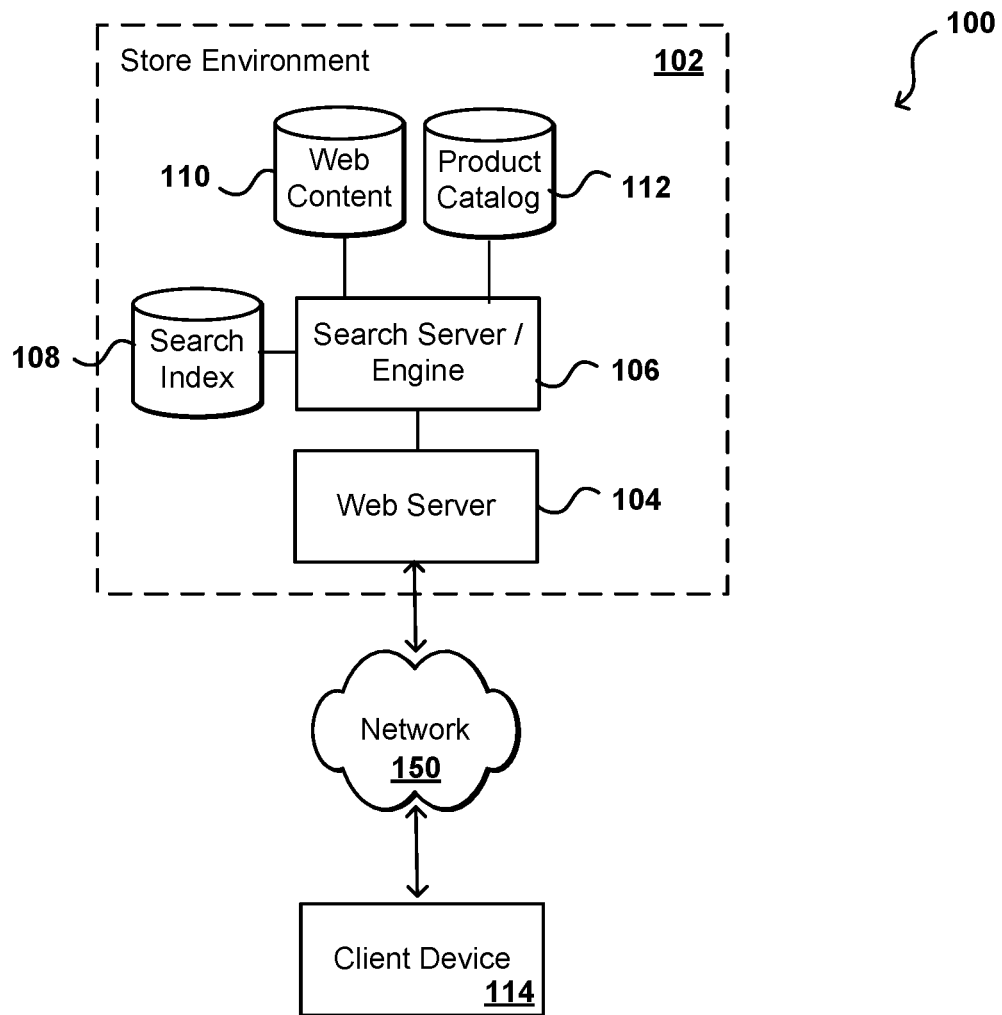
FIG. 1A illustrates components of an environment in which aspects of various embodiments can be implemented.

Approaches in accordance with various embodiments provide a product search framework that models query entities as two-vector hyperboloids, learns inter-entity geometric interactions, and utilizes attention over individual entities and inter-entity geometric interactions to predict product matches from a search space. In one or more embodiments, models may utilize first and second hyperboloids to determine a query's semantic position and to tune its surrounding search volume. Moreover, attention networks may capture the relevance of intra-entity and inter-entity geometric interactions to the final query space.

In at least one embodiment, products and/or units may be associated with a hierarchical storage structure, such as within a catalog, knowledge group, or other search space. By way of example, a hierarchical structure may be applied to a catalog for footwear, where the general footwear category includes subcategories, such as brands, types of footwear, and the like. Within these subcategories, additional subcategories may further be provided, such as organization by colors, specific models, and so forth. As a result, products and/or units may have a structural relationship that may make searching or traversing through the catalog easier with a logical set of instructions. Embodiments of the present disclosure utilize hyperbolic representations to present and/or group these relationships. Hyperbolic representations provide better separation and/or grouping of than traditional Euclidean embeddings, which may not accurate encapsulate each item within a subgroup or may have incorrect overlaps due to crowding at leaf nodes within a structure. Accordingly, search results may be improved by converting the representations into hyperbolic embeddings to represent a search space, where relationships between the various Euclidean embeddings may be retained. It should be appreciated that various references may be made to hyperbolic space but approaches may be utilized with various non-Euclidean geometries. Moreover, references to hyperboloids are non-limiting and it should be appreciated that other shapes or encapsulations, such as paraboloids and the like, may also be utilized with embodiments of the present disclosure.

In at least one embodiment, a search architecture is developed that receives one or more search queries that are transformed to the hyperbolic space (e.g., hyperboloids). This transformation may be utilized to continue representing certain features present within the traditional Euclidean representations of the search query, and moreover, may enable continued use of algebraic operations through the use of gyrovector spaces that enable these operations to be formalized in the hyperbolic space. The converted search queries may be processed, for example via one or more machine learning systems that may reduce noise or otherwise emphasis particular contextual relationships in the search queries, and moreover may further develop query entities or geometric combinations to improve search functions. This may enable formation of a search space that can be compared to a product space, where certain products within a catalog or knowledge group have been embedded, to provide improved search results.

Systems and methods may also be directed toward an architecture to embed products and/or units within a hyperbolic space, such as those described in "Self-Supervised Hyperboloid Representations from Logical Queries over Knowledge Graphs," by Choudhary et al., accepted for publication at The Web Conference 2021, Apr. 19-23, 2021, Ljubljana, Slovenia and currently publicly accessible, which is hereby incorporated by reference, in its entirety, for all purposes. For example, one or more items may be processed, for example with a machine learning system, to convert the products from a Euclidean representation to the hyperbolic space. Further processing may then be performed within the hyperbolic space by utilizing, as an example, gyrovector spaces, among other options. To traverse through the units forming the catalog, one or more queries may be generated by one or more machine learning systems within the architecture, where the queries may be generated responsive to one or more operations and/or features of the product items. These queries may enable identification of how broad or narrow different regions are corresponding to the units and may enable further refinement of the model for product embedding. As noted above, the architecture may be used to simulate or otherwise model multiple searches, compare the results with a set of ground truth data, feed back training information, and then continue to refine product embeddings. In at least one embodiment, the architecture includes one or more loss functions in order to minimize errors, which may be categorized by evaluating distances between certain points of the generated queries (e.g., a center point, an edge) and points of the embedded products. Furthermore, there functions may be dynamically utilized via one or more embedded switches, where input information, such as ground truth data, among other options, may include instructions to enable data transmission through one or more switches. As a result, mixed data sets may be deployed, which may include corresponding ground truth information, at various points within the architecture.

It should be appreciated that embodiments of the present disclosure may be described with respect to products in a catalog, such as products available for purchase through a marketplace or other online storefront. This description is for illustrative purposes only and embodiments may be expanded toward a variety of different search functions where data is stored within some hierarchical structure. Accordingly, it should be appreciated that references to products are not intended to be limiting, but rather, are provided as an example of an embodiment where systems and methods of the present disclosure may provide improved search results by representing those products within a hyperbolic space and converting search queries such that hyperboloids may be evaluated against the search space.

Embodiments of the present disclosure address and overcome various problems associated with traditional search structures for data that is stored within a hierarchical structure, where a structural relationship may exist been various components of the data. Moreover, various embodiments may also be deployed responsive to other types of data storage systems. As opposed to evaluating text that represents certain data, such as a title or one or more tags, embodiments are directed toward utilizing and maintaining structural relationships between data. By embedding items within the hyperbolic space, this structure may be used, as opposed merely trying to match textual searches. Accordingly, search queries may be converted and matched to spaces, which may provide improved results.

FIG. 1 illustrates components of an example computing environment 100 that can be used to implement aspects of the various embodiments. In this example, a user is able to utilize a client device 114 to submit requests for content across one or more networks 150, such as the Internet or a cellular network. The client device can be any appropriate computing device capable of generating such a request, as may include a smartphone, desktop, set-top box (e.g., Fire TV), voice-enabled device (e.g., Echo), or tablet computer. In this example, the request may comprise a request for content about one or more products or services that are offered by an entity, such as a retailer or selling partner offering products side-by-side in online stores. It should be understood that a retailer is just one example of such an entity, however, as there may be providers of various other types of content that could take advantage of aspects of the various embodiments as well, as would be understood to one of ordinary skill in the art in light of the teachings and suggestions contained herein.

In this example, the request may be directed to an address associated with a store environment 102, or a set of hardware and software resources utilized by the retailer to provide electronic content, at least some of which may relate to products and/or services offered by the retailer. A store environment in some embodiments includes a collection of network-accessible services executed on computer hardware that provide multiple channels (e.g., mobile app., voice-based search, web access, physical presence, etc.) through which customers (using a client computing device) can access various catalogs stored in databases to find various products and services available to purchase, lease, etc. sometimes in the form of detail pages. Although a single store environment is illustrated, it should be understood that there may be multiple retailers or store environments accessible over the at least one network as discussed elsewhere herein. The products and/or services may be offered for varying types of consumption, such as purchase, rent, lease, download, stream, and the like. In this example, the request will be received to a server, such as a web server 104, of the store environment 102. The web server 104 can direct the request, or information such as keywords from the request, to a search server 106, search engine, or other such device, service, process, or component that is able to execute the query (or query terms) against a search index 108 corresponding to products or services offered by the retailer. The results can be used to provide relevant information (e.g., title and description) for products and services that are determined to be at least somewhat relevant to the search query. The relevant information can be pulled from a product catalog 112, for example, and combined with web content from a web content repository 110 or other such location, in order to provide a webpage with search results to return to the client device 114 for display. Any of a number of different approaches to determining results from executing one or more search terms against a search index can be utilized within the scope of various embodiments.

Figure 1B:
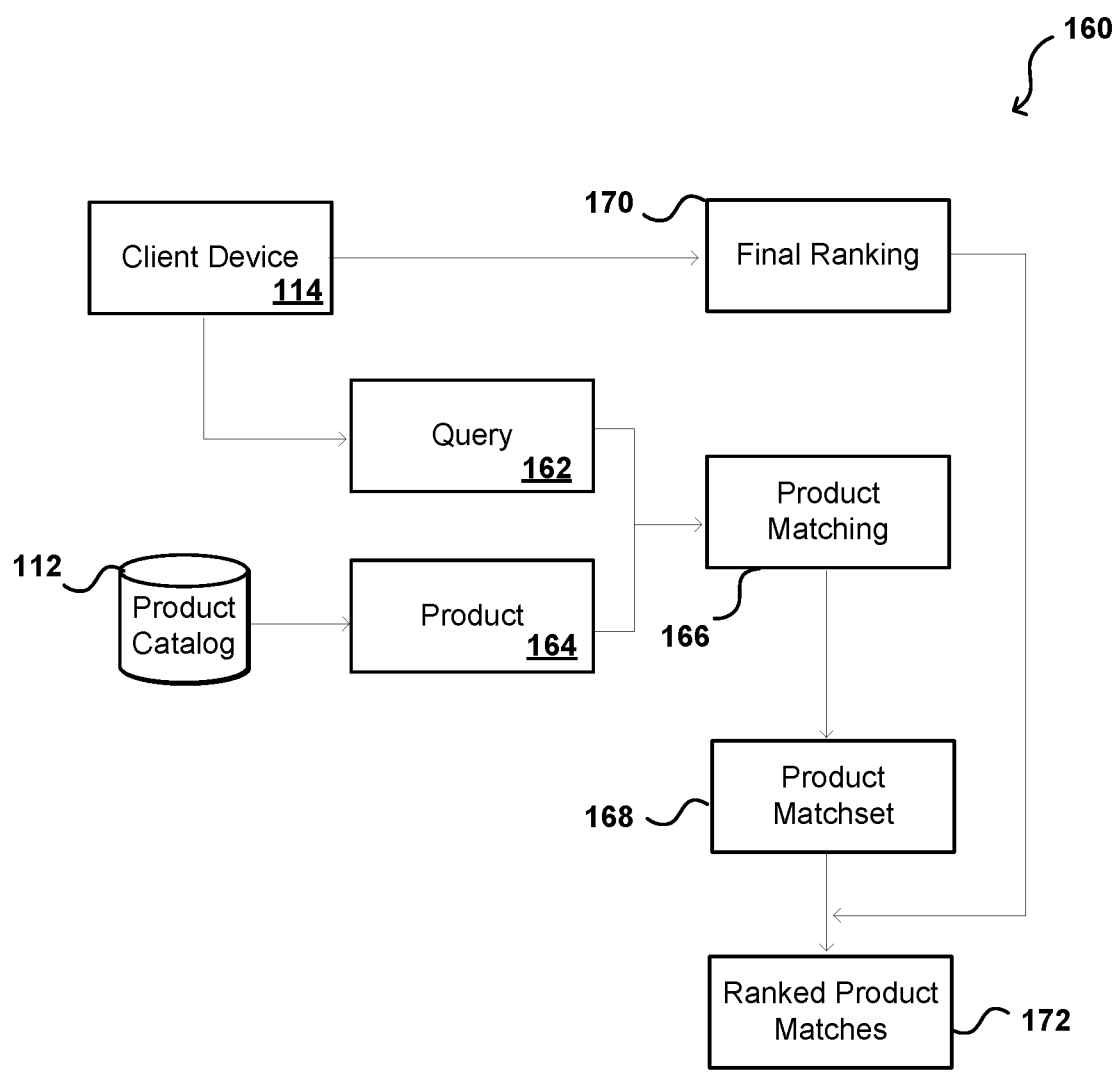
FIG. 1B illustrates an architecture of an environment in which aspects of various embodiments can be implemented.

As mentioned, however, the accuracy of the search, or relevance of the search results, will depend in large part upon the quality of the search index 108 that is utilized and/or the specificity of the query provided by the user. Current approaches in the area utilize lexical and semantic product information to match user queries against products. Often, search results are provided as a ranked or tiled list of products that best match the inferred intent of the query. Search frameworks often include at least two modules, a matching phase that generates a set of items deemed relevant to the query and a ranking phase that ranks these items in a certain order or relevance. FIG. 1B illustrates a product search framework 160, where the client device 114, via a user, may submit a query 162 for processing. Information from the product catalog 112 is utilized in the form of the individual products 164 to perform product matching 166 against the query and the products. As an example, a lexical or semantic process may be used to determine whether one or more features of the query corresponds to products within the catalog. For example, queries may be lexically matched to an inverted index to retrieve all products that contain the query's words. In various embodiments, this may be done offline as an entire catalog may be evaluated against a library of queries to generate a set of rankings or results. This may be useful if a provider has identified frequently searched queries.

In various embodiments, product matching 166 evaluates similarities between the query and the product. It should be appreciated that a variety of different product matching techniques may be used that will not be discussed herein for brevity. A product matchset 168 may be produced to identify a set of products that correspond to the query. Moreover, a final ranking 170 may be applied to the product matchset 168 to generate ranked product matches 172. The final ranking 170 may include one or more rules to rank or otherwise present items, such as by popularity, based on user profile information, or the like. Often, products are represented in a hierarchical fashion, however, this structure is often lost with traditional searching techniques, which may be applied using Euclidean geometry to identify one or more products corresponding to an input query. Moreover, lexically matching products may fail to understand a query's semantic intent by disregarding hypernyms, synonyms, or antonyms. Furthermore, techniques may also include lemmatization during preprocessing, which loses morphological information and may not capture out of vocabulary words.

Embodiments of the present disclosure may be directed to a framework that maps both queries and products to a hyperbolic space. For example, products within a catalog may be transformed to hyperbolic space and then mapped such that leaf nodes of the hierarchical system may be represented within hyperboloids with less likelihood of overlap or capturing due to the structure of the catalog. Accordingly, queries may be processed against a hyperbolic space representing one or more catalogs or collections of data, such as knowledge graphs, and then mapped to determine matching products to those queries. In various embodiments, a machine learning system may be utilized to traverse a catalog with generated queries in order to determine whether the product embeddings within the hyperbolic space are accurate. This system may generate sample queries to traverse the catalog and utilize one or more dynamic switches to adjust various aspects of the query generation, among other features, to determine how ground truth data compares to the embedded products. Accordingly, a search system may include one or more systems to develop product embeddings and one or more systems to transform search queries for analysis against the product embeddings, among other features and uses.

Figure 2:
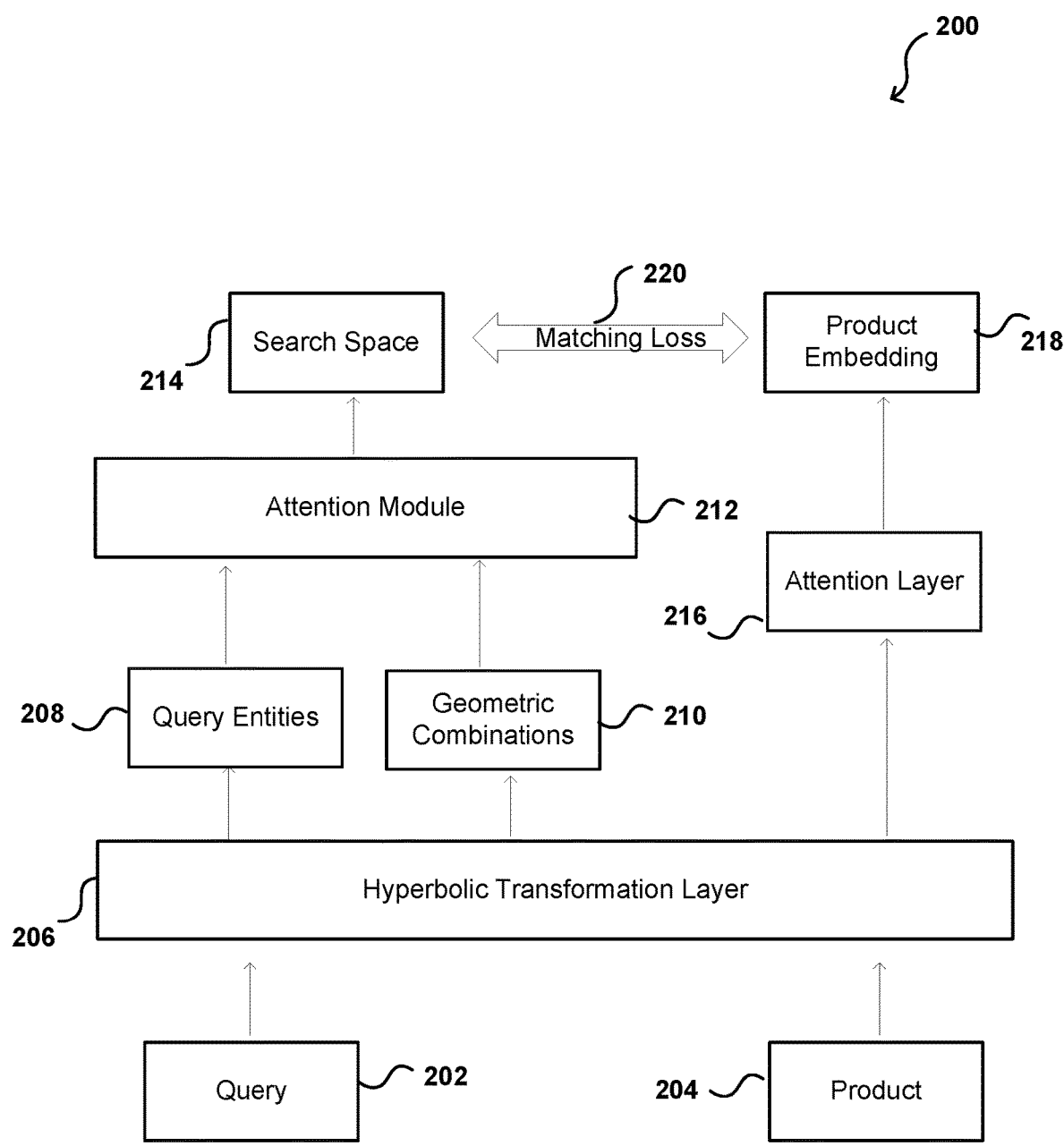
FIG. 2 illustrates an architecture of an environment in which aspects of various embodiments can be implemented.

FIG. 2 illustrates a search framework 200 that may be used with one or more embodiments of the present disclosure. The illustrated framework 200 may be utilized with one or more catalogs or groups (e.g., knowledge groups) to model both the items within the catalogs or groups and associated queries within a hyperbolic space as hyperboloids. In one or more embodiments, Euclidean coordinates and geometry may be received, transformed to hyperbolic space, and then mapped. Algebraic operations performed on these transformed coordinates may use one or more operations associated with gyrovector spaces, thereby enabling various techniques and structures to be utilized even after the conversion to the hyperbolic space. The queries may further be processed and then applied to the hyperbolic space to identify matching or related products or items from the catalog. By way of example only, queries may be further processed by identifying various geometric combinations, such as trigrams and/or pairs of trigrams, and then an attention layer may be utilized to enhance important or salient trigrams or combinations, while less important trigrams or combinations are reduced or otherwise removed. It should be appreciated that importance may be determined based on context that is learned through training data presented to one or more machine learning systems. Various embodiments of the present disclosure may relate to software systems that execute on processors or processing units (e.g., central processing units (CPU), graphics processing units (GPU), etc.) based on instructions stored on a non-transitory machine-readable storage medium. In certain embodiments, software packages or individual components may be referred to as modules, where the module includes a particular set or portion of code stored on one or more memories that is executed on one or more processors. The set or portion of code may be related to one or more algorithms to logically execute instructions.

The illustrated embodiment includes an input query 202 (which may be similar to or correspond to the query 162 of FIG. 1B) and an input product 204 (which may be similar to or correspond to the product 164 of FIG. 1B). It should be appreciated that the input query 202 and/or the input product 204 may include multiple queries or multiple products, where processing may be done in parallel, for example using a multi-core processor or GPU having architecture for parallel processing. These features may be described with reference to two different paths, where a first path corresponding to the query 202 may be utilized to perform a hyperbolic transformation, determine query entities and/or geometric combinations from the converted query, apply attention in order to identify salient information, and then map the converted query to hyperbolic space. A second path corresponding to the input product 204 may be utilized to perform a hyperbolic transformation and then to map the product to hyperbolic space, which may also be referred to as product embedding, as will be described below. It should be appreciated that a single system or framework may be used with both the input query 202 and the input product 204, and moreover, in various embodiments independent frameworks may be utilized. In at least one embodiment, a hyperbolic transformation layer 206 may be common between the paths, but it should be appreciated that different transformation layers 206 may be utilized. The hyperbolic transformation layer 206 receives an input, either the query 202 or the product 204, among other options, which are generally provided as a Euclidean representation within a two-dimensional (2D) space. The hyperbolic transformation layer 206 converts the respective Euclidean representations to hyperbolic space ( $\mathbb{H}^n$, $g^{\mathbb{H}}$ ) by the manifold $\mathbb{H}^n = \{x \in \mathbb{R}^n : \|x\| < 1\}$ with the Reimannian metric, shown in Equation 1

$$g_x^{\mathbb{H}} = \lambda_x^2 g^{\mathbb{E}} \text{ where } \lambda_x := \frac{2}{1 - \|x^2\|} \quad (1)$$

with $g^{\mathbb{E}} = I_n$ being the Euclidean identity matrix tensor, and $\|x\|$ is the Euclidean norm of x. Moreover, $\lambda_x$ is the conformal factor between the Euclidean and hyperbolic metric tensor set to a conventional curvature of −1. Accordingly, the hyperbolic transformation layer 206 may convert a Euclidean metric to hyperbolic. As will be described below, this conversion may enable more accurate hyperboloids to be formed to provide areas within a search space, where an overlapping query spaces and product spaces may correspond to products responsive to queries. Moreover, it should be appreciated that various algebraic operations traditionally applied with respect to Euclidean representations may also be used within the hyperbolic space by utilizing gyrovector spaces to formalize the algebraic operations in the hyperbolic space.

Staying with the first path, the transformed input query (e.g., hyperbolic search query) may be processed to evaluate entities and geometric combinations. A query entity module 208 may include one or more software packages stored on one or more memories executed by one or more processors. The software packages may include logical instructions, for example in the form of one or more algorithms, executable based on input data. In various embodiments, input data may correspond to a search query and the algorithms may be used to divide one or more portions of the input query into entities. Entities may correspond to trigrams of the search query including wild card or placeholder characters. By way of example only, an input query may include one or more words or phrases, such as "alpha and beta shoes," where alpha and beta correspond to brand names of shoes. After the transformation, the search query may be divided into the entities. An algorithm may identify different words within the query, remove filler or extra words, identify linking words or other Boolean operations, and then form the entities, which in this example are trigrams. For the example input search query, trigrams may correspond to "#al," "#be," "#sh," "al #," "be #," and the like, where # is representative of a wild card or placeholder character positioned at the beginning and ends. Additionally, trigrams may not use the wild card, such as "alp," "bet," and the like. Accordingly, in one or more embodiments, a sample algorithm corresponding to the query entity module 208 may include steps of receiving a query input, identifying one or more words or phrases within the input (such as via one or more natural language processing methods), forming trigrams of the one or more words, and outputting the trigrams.

The illustrated embodiment further includes a geometric combinations module 210, which may be used to form pairs or groups of trigrams or other query entities. In at least one embodiment, an intersection layer may be utilized to aggregate centers for respective hyperboloids and then processed via attention and minimum layers. The geometric combinations may form pairs of entities, such as trigrams. Returning the example input of "alpha and beta shoes," the geometric combinations may correspond to "(#al, #be)," "(alp, bet)", "(#al, alp)", and the like. As illustrated, the combinations may be either both from a single word (e.g., both from alpha) or may be a combination of words extracted from the input search query (e.g., both alpha and beta). In various embodiments, the geometric combinations module 210 may correspond to one or more portions of code stored on machine-readable memory and executable by one or more processors. The one or more portions of code may correspond to a logical structure of instructions, which may be in the form of one or more algorithms. As noted above, the algorithms may include the steps to form the entities (e.g., trigrams) and may also include steps for forming the geometric combinations. In at least one embodiment, the algorithm may include steps such as receiving the hyperboloids for the input query, forming the entities as noted above, selecting entities to form entity groups, and storing the entity groups. Accordingly, the illustrated framework 200 may enable mapping of input queries using a variety of different entities and pairings to identify relationships between query inputs and products within a hyperbolic space.

In at least one embodiment, an intersection layer is included to identify a user's intent for the search. For example, the user's intent may not always be the union of its entities, and as a result, features of the query may be lost. In at least one embodiment, the user's intent may be an intersection between some parts of the search query. By way of example only, the query for "alpha shoes" is an intersection of a brand entity (alpha) and an object entity (shoes). Accordingly, one or more embodiments may be utilized to identify and associate relations between different entities through intersection operations on 2D spaces. As noted above, these functions may be extended to the hyperbolic space and define intersection of the queries, to form a new intersection center and limit. Accordingly, this intersection and limit may be aggregated by one or more attention layers over the centers and also by shrinking the limits with a minimum over queries. As a result, improved geometric combinations may be developed to identify user intent, thereby enabling improved mapping of queries to a search space.

In various embodiments, an attention module 212 is provided to receive output entities and/or pairings from the query entities module 208 and the geometric combinations module 210. It should be appreciated that the attention module 212 may correspond to software instructions stored on one or more memories executable by one or more processors. The attention module 212 may correspond to one or more input processing techniques for neural networks that allow the network to focus on one or more specific aspects of a complex input, one at a time until the entire or a set portion of the dataset is categorized. In various embodiments, attention utilizes continuous reinforcement and/or backpropagation training. The attention module 212 may be utilized to identify relevant context between different words or phrases, and/or their respective entities or geometric combinations, associated with the search queries. The output of the attention module 212 may correspond to a search space 214, where the search space 214 includes a set of hyperboloids for the input query. As will be described, the search space 214 may also include product embeddings such that the input query hyperboloids may be mapped to the search space 214 to identify overlapping regions that correspond to positive matches to the search query.

Returning to the second path, the input product 204 may correspond to one or more items within a catalog, such as a catalog of products available for purchase through a store, such as an online marketplace. Additionally, the input product 204 may correspond to any number of items within a knowledge graph, which may be a ubiquitous structure for information storage, such as e-commerce, social networks, biology, and the like. Accordingly, it should be appreciated that various embodiments of the present disclosure may be utilized with input products that correspond to various hierarchical storage structures across a variety of industries where data may be categorized and presented to users via one or more search queries.

As described above with respect to Equation 1, the input product 204 may be in the form of 2D Euclidean geometry that is covered to a hyperboloid via the hyperbolic transformation layer 206. Thereafter, an attention layer 216, which may be similar to or the same as attention layer 212, may be utilized on the hyperboloids to identify contextual relationships prior to execution via a product embedding module 218. As will be described below, product embedding may include one or more layers featuring hyperboloid constructors, Poincare loss, and an output. Moreover, one or more dynamic switches may be embedded within a product mapping architecture in order to limit various constructors related to translation, intersection, and unions to form the hyperboloids. These results may then be mapped to a hyperbolic space, after resting against ground truth data in one or more machine learning systems.

In operation, a matching loss module 220 is executed to identify overlapping regions in the hyperbolic space with respect to the search space 214 and the products embedded within the hyperbolic space. It should be appreciated that the matching loss module 220 may include one or more code portions stored on machine-readable memory that may be executed by one or more processors. The matching loss module may include algorithms chosen according to noise processed assumed or determined to contaminate the data. The matching loss may also be referred to as an error function that adjusts weightings and other positioning of the features of hyperboloids in the hyperbolic space. Accordingly, it should be appreciated that the matching loss module 220 may include one or more sets of algorithms to evaluate how well specific correlations between search inputs and products are, where a distance between a query hyperboloid and a product hyperboloid may be evaluated to determine how closely related the query is to the product. As will be appreciated, this distance, rather than being calculated in a Euclidean geometry, may be determined within the hyperbolic space, thereby utilizing the improved representations and groupings enabled by the conversion to hyperbolic space. In this manner, search queries and product inputs may be converted to the hyperbolic space for improved search results.

Figure 3A:
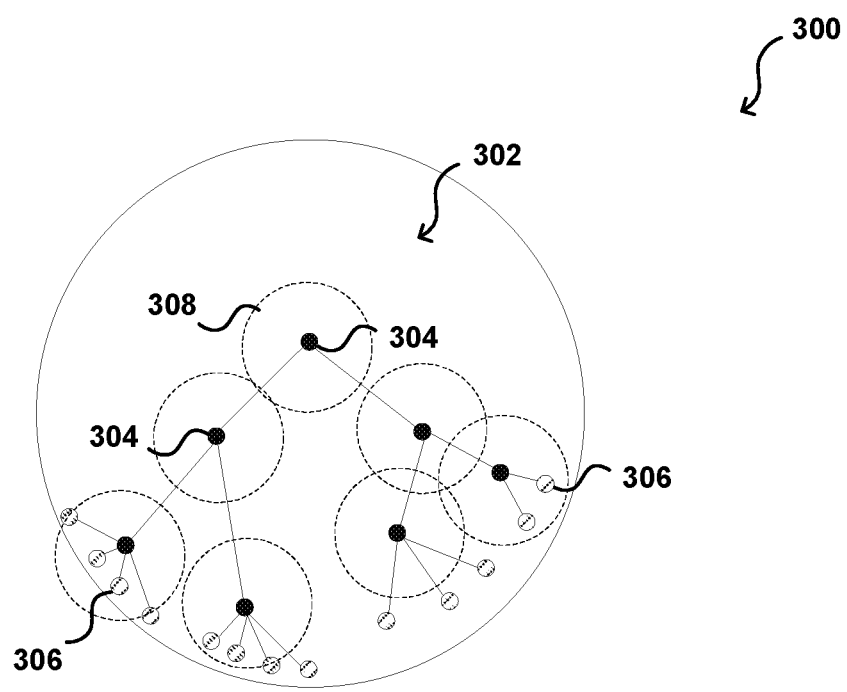
FIGS. 3A and 3B illustrate graphical representations of nodes in which aspects of various embodiments can be implemented.
Figure 3B:
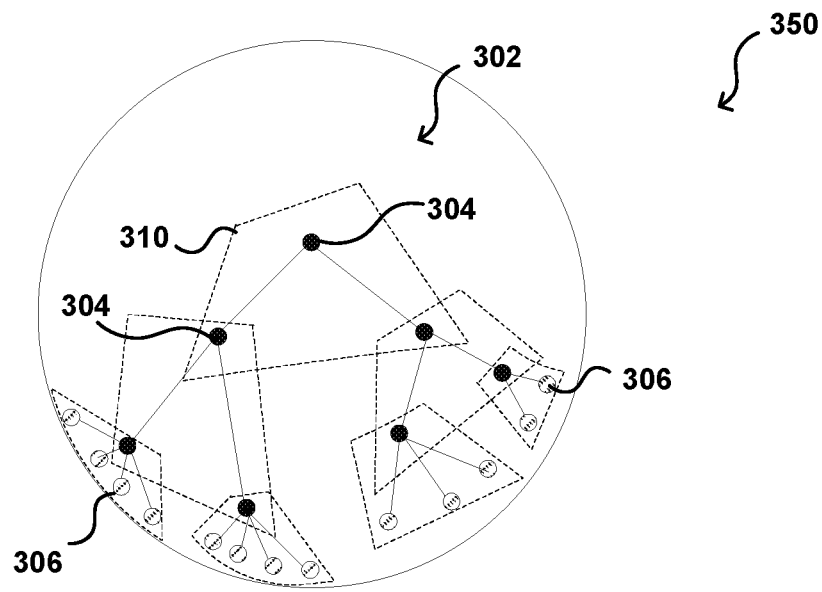

FIGS. 3A and 3B illustrate representations 300, 350 of nodes 302 within a space. In this example, a higher precision is illustrated when using hyperboloids, as noted above, rather than using hyperbolic vectors to encapsulate child entities within a space. As this example, the nodes 302 are illustrated in a hierarchical structure where intermediate nodes 304 are connected to leaf nodes 306. The leaf nodes 306 include a different shading for clarity with the following discussion. As shown in the representation 300, hyperbolic vectors are utilized to generate an encapsulation 308 which uses a threshold from a center. In this representation, there is significant overlap between various encapsulations 308, and in some cases, the leaf nodes 306 from their respective intermediate nodes 304 are not included within the encapsulations 308. As a result, there is less precision for grouping different nodes represented by this hierarchical structure.

Embodiments of the present disclosure may utilize the hyperboloids encapsulations 310 illustrated in the representation 350. In this example, the respective hyperboloid encapsulations 310 encapsulate all of their respective child entities between the intermediate nodes 302 and the leaf nodes 306. Moreover, the sizes of the hyperboloid encapsulations 310 are dynamic, as opposed to the substantially constant sizes of the encapsulations 308 from the hyperbolic vectors. Accordingly, embodiments of the present disclosure may utilize these hyperbolic encapsulations in order to embed products within a hyperbolic space to enable improved searching and retrieval.

Figure 4:
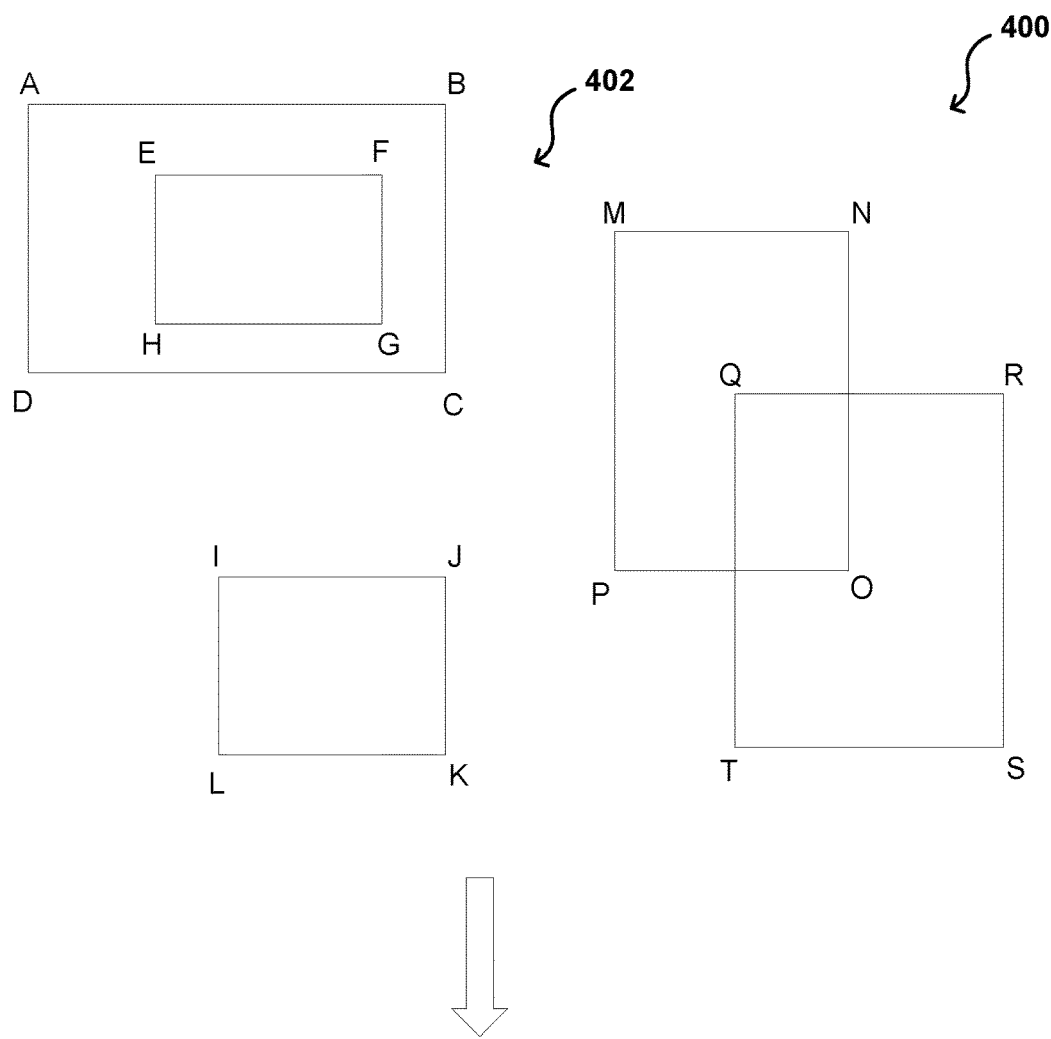
FIG. 4 illustrates a graphical representation of a conversion from Euclidian geometry to a hyperbolic space.
Figure 4:
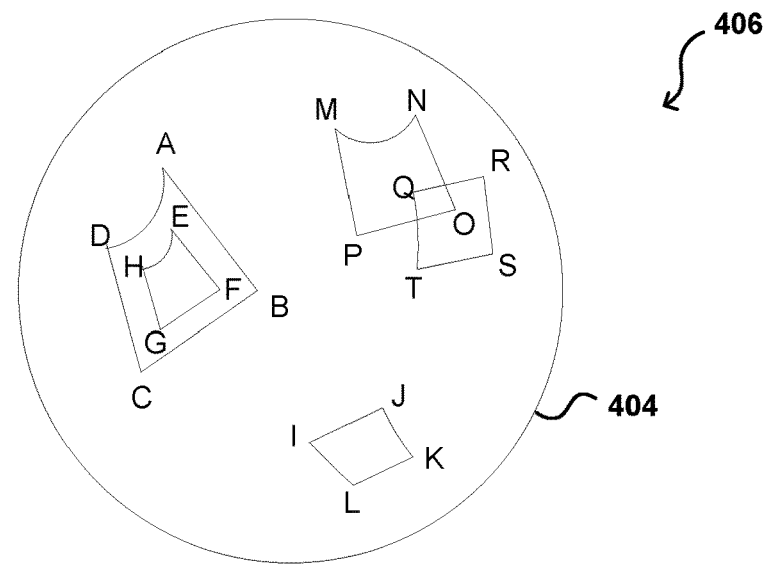

FIG. 4 illustrates a representation 400 of a transformation between Euclidean geometries to hyperboloids. In this example, the hyperboloids are illustrated along a Poincaré ball (horocycle enclosures) and are representative of encapsulations along a surface of the ball. That is, the lines are shown along a curved surface of a sphere such that a distance between two points is not a straight line (e.g., a line in the x-y plane) but is a curved line that also have some z-axis elements. A set 402 of Euclidean geometries is shown as a series of rectangles, which will be described by letters at their vertices, corresponding to ABCD, EFGH, IJKL, MNOP, and QRST. As will be shown, relationships between various geometries in the set are maintained between the Euclidean space and the hyperbolic space.

In this example, ABCD surrounds EFGH such that each of the vertices of EFGH is within a boundary formed by ABCD. Moreover, in this example, there is partial overlap between MNOP and QRST where Q is within MNOP and 0 is within QRST. IJKL is positioned offset from each of the geometries and is not in contact with those geometries. In various embodiments, coordinates for the set 402 may be provided to the hyperbolic transformation layer 206 in order to transform the geometries into hyperboloids along the hyperbolic space. As shown, a hyperbolic space 404 is represented by a circle, but it should be appreciated that this circle corresponds to a three-dimensional (3D) sphere, where hyperboloids positioned along the sphere are along a surface of the surface of the sphere. A set 406 of hyperboloids are illustrated having the same vertices described below. In this example, however, the hyperboloids are no longer Euclidean rectangles and do not have curved edges extending between vertices. However, it can be seen that the relationships are maintained. That is, EFGH is still within ABCD while there is still partial overlap with MNOP and QRST. Moreover, IJKL remains offset and not in contact with the remaining hyperboloids. As noted above, this transformation may enable more precise encapsulations of various nodes within a hierarchical structured data set, thereby enabling improved mapping of search queries for improved search results.

Figure 5:
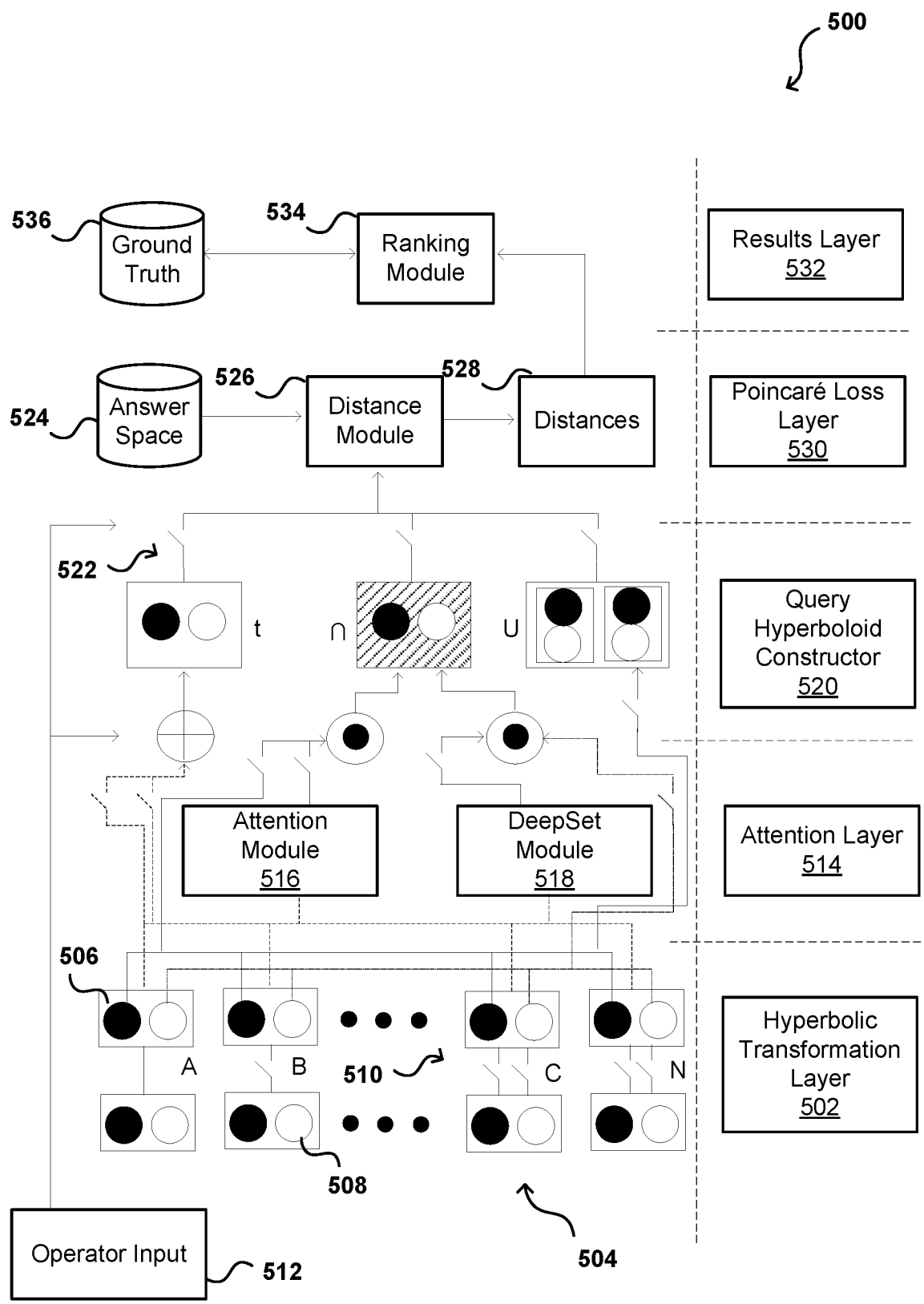
FIG. 5 illustrates an architecture of an environment in which aspects of various embodiments can be implemented.

In various embodiments, systems and methods may be utilized to improve search frameworks, such as by improving a product matching portion of a search framework in order to utilize hyperbolic space representations with product and query mapping. Product inputs may be provided from one or more catalogs or knowledge graphs, which can store the information in a hierarchical structure, transform the information to hyperbolic space using Equation 1, and then process the information in order to map and/or embed the information to hyperbolic space. FIG. 5 illustrates an embedding architecture 500 which may be used with embodiments of the present disclosure. The architecture 500 may receive, as an input, one or more products from a hierarchical structure, transform the input to hyperbolic space, utilize an attention layer to identify relationships and context, generate queries using a hyperboloid constructor, map hyperboloids to the hyperbolic space, and then check the mapping against ground truth data when analyzed with the generated queries in order to adjust and refine the embeddings.

In this example, a hyperbolic transformation layer 502 may correspond to the hyperbolic transformation layer 206 in FIG. 2, where Equation 1 may be utilized to transform a Euclidean representation to the hyperbolic space. A series of transformations 504 may correspond to different products or items within the catalog and/or knowledge group and include coordinates corresponding to both a center 506 and a limit 508 of the units. As will be appreciated, the center 506 may correspond to a central location while the limit 508 may correspond to a distance to an edge of the unit. In various embodiments, different transformations 504 may be restricted or unused with respect to query construction, for example using one or more dynamic switches 510. These switches may enable or block the flow of information such that, in this example, with the switches 510 in the open position, only information from the first transformation 502A will be utilized, while the remaining units (504B-504N) are not. It should be appreciated that the switches 510 may be controlled by an operator that is beginning training or may be a result of input instructions for a training and/or embedding operation.

In at least one embodiment, switches 510 are located at various locations throughout the architecture to restrict information utilized at the various layers. An operator input 512 may provide instructions regarding a position of the switches 510 (e.g., an open position or a closed position). For example, for a given set of inputs, the operator input 512 may control one or more of translation, intersection, or union operations by controlling which switches 510 are in the open or closed position. The transformations 504 may be directed toward an attention layer 514, which may include an attention module 516, such as the module described above, along with a DeepSet module 518. In at least one embodiment, the DeepSet module 518 includes machine-readable instructions stored on one or more memories to be executed by one or more processors. The DeepSet module 518 may correspond to one or more machine learning architectures for implementing arbitrary set functions, that is, functions over collections of items where the order of the items is not important. As illustrated, additional switches 510 may also be implemented within the architecture in order to control data flow from the attention layer.

A query hyperboloid constructor layer 520 is shown that includes different operators 522 for translation, intersection, and union operators. In one or more embodiments, processed transformations 504 are directed toward these operations as queries are constructed in order to generate one or more queries. The queries may be utilized for training purposes to traverse through the catalog or knowledge group provided to the architecture. As a result, embeddings may be analyzed and adjusted when compared to ground truth data. In at least one embodiment, a series of queries is generated and then data from an answer space 524 is utilized at a distance module 526 to compute distances 528 within a Poincare loss layer 530. It should be appreciated that distance may be determined similarly to computing distances in Euclidean geometry, but with the additional step of performing a similar calculation in the hyperbolic space, such as by utilizing the gyrovector spaces described herein. The Poincare loss layer 530 is utilized to minimize losses in order to identify and position the hyperboloids in the proper location, as noted above. Thereafter, in a results layer 532, a ranking module may be utilized 534 and compared to ground truth data 536 to determine whether adjustments may be made to the model. In this manner, products from catalogs may be processed within a machine learning system that converts Euclidean geometry to a hyperbolic space and then continues to process the products within the hyperbolic space in order to embed the hyperboloids for traversal by one or more queries. These queries are then evaluated against the embeddings using ground truth data to adjust positions of the product embeddings.

Figure 6:
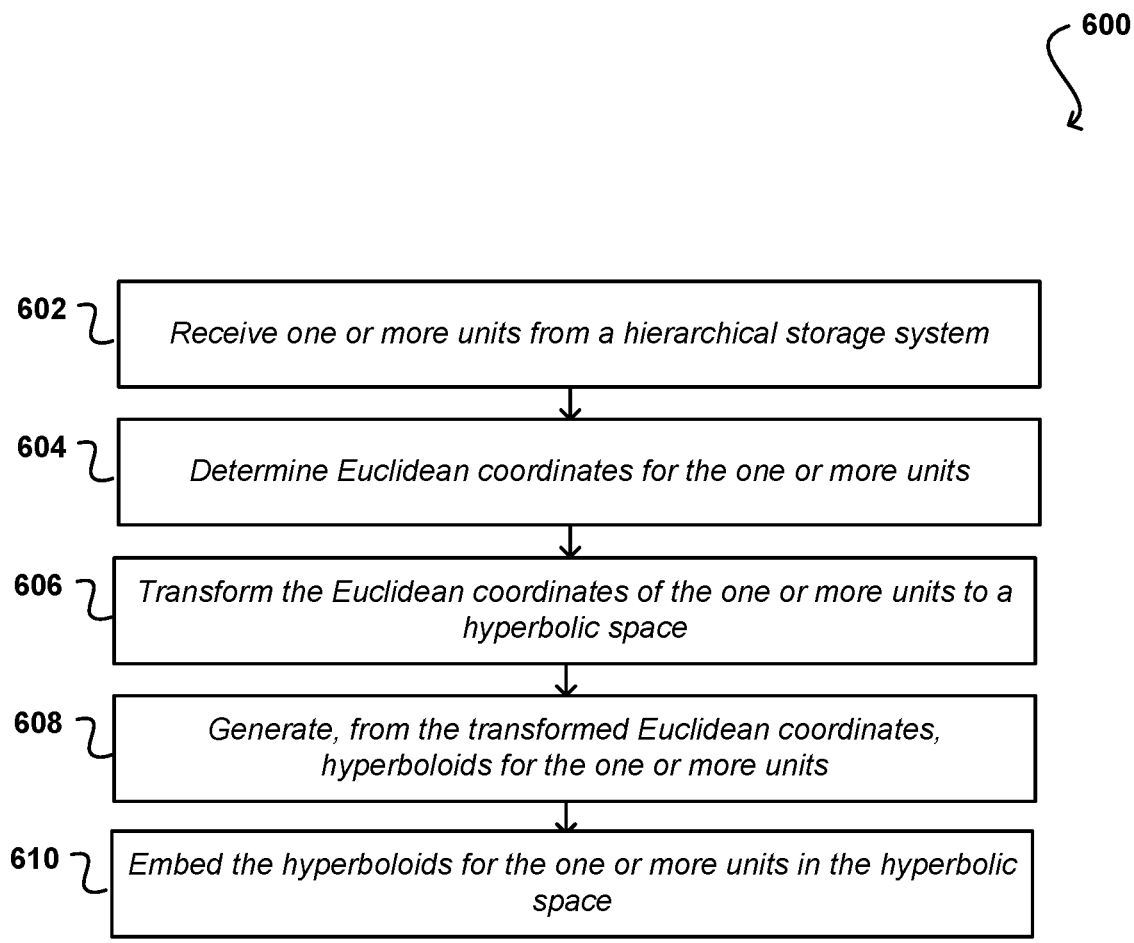
FIG. 6 illustrates an example process for embedding search units in a hyperbolic space that can be utilized in accordance with various embodiments.

FIG. 6 illustrates a process 600 for embedding one or more units from a hierarchical storage system within a hyperbolic space that can be utilized in accordance with one embodiment. It should be understood for this and other processes discussed herein that there can be additional, alternative, or fewer steps performed in similar or alternative orders, or in parallel, within the scope of the various embodiments unless otherwise stated. In this example, one or more units from a hierarchical storage system are received 602. The units may correspond to products within a catalog, data sets within a structural database, or the like. In at least one embodiment, the units are stored in a hierarchical structure such that each of the units has a relationship to one or more other units within the structure. Accordingly, embodiments are directed toward maintaining this structural relationship while also modifying presentation of the units to enable improved searching within a modified space.

In at least one embodiment, Euclidean coordinates for the one or more units are determined 604. The Euclidean coordinates may correspond to x-y coordinates within a 2D place, for example as a rectangle or other shape. The coordinates may be represented by one or more vertices of a shape and/or by a center point of the shape. In one or more embodiments, Euclidean coordinates may correspond to metadata associated with the units. In various embodiments, the Euclidean coordinates are transformed to a hyperbolic space 606. Conversions may be performed by one or more computations executed by a processor. Coordinates are converted to various hyperboloids 608 that may be represented as a warped shape along a surface of a sphere. As noted above, such a conversion enables more refined grouping of items within the hierarchical structure, while also maintaining the structural relationship of units forming the structure. The hyperboloids may be embedded within a hyperbolic space 610. This embedding enables search queries to also be converted to hyperboloids and then similarly mapped across the hyperbolic space to determine whether one or hyperboloids overlap, indicating a responsive item for a query. The embedded hyperboloids may provide a more accurate and refined representation of the structure while still enabling evaluation against one or more search queries, thereby providing an improved set of search results.

Figure 7:
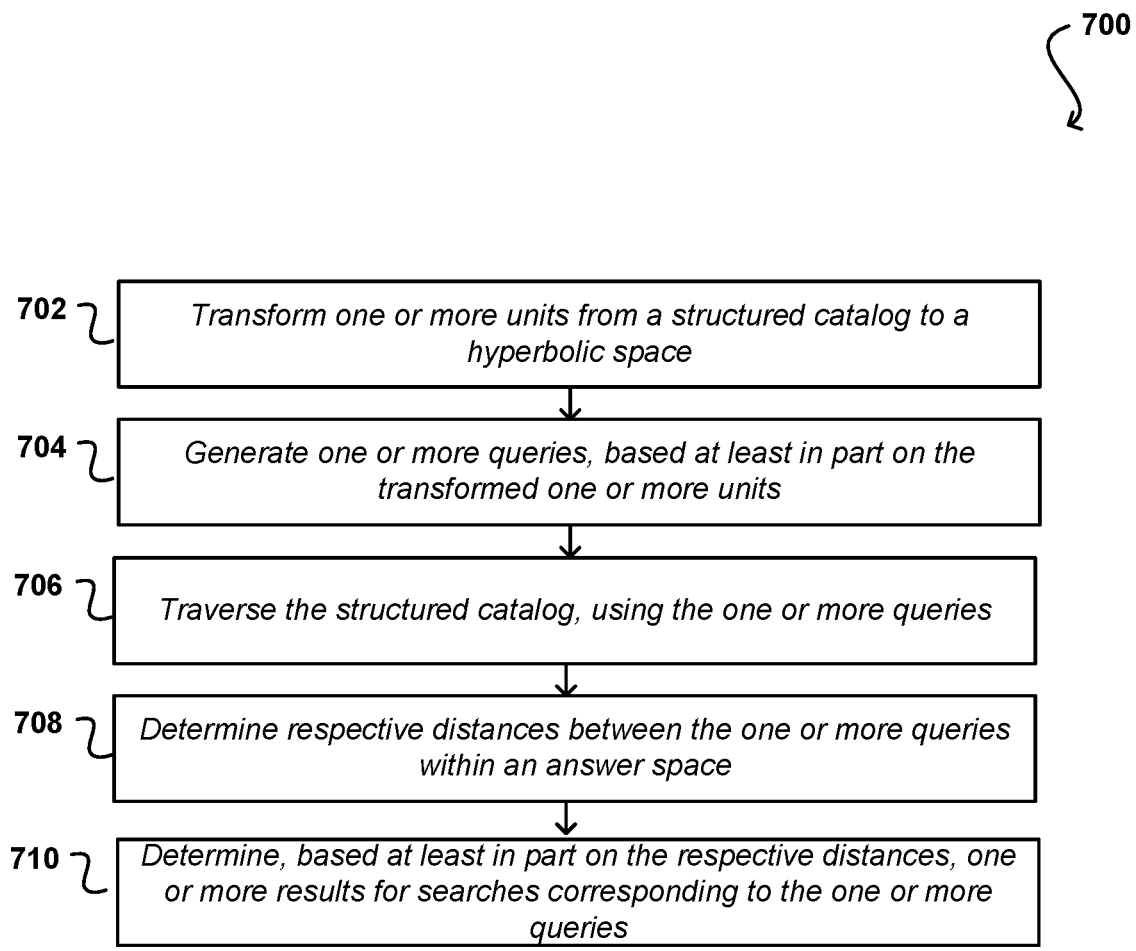
FIG. 7 illustrates an example process for generating and training a search space that can be utilized in accordance with various embodiments.

FIG. 7 illustrates a process 700 for training an architecture within a hyperbolic space. In this example, one or more units from a structured catalog are transformed to a hyperbolic space 702. In various embodiments, the units may be stored in a hierarchical structure with Euclidean coordinates that are transformed to the hyperbolic space, for example as hyperboloids. In certain embodiments, transformations may include evaluating centers, limits, or both for different units. These units, after the transformation, may be further processed by one or more machine learning algorithms and/or systems, such as an attention or DeepSet system, to reduce errors within the transformations. In at least one embodiment, the transformed units are utilized to generate one or more queries 704. For example, query constructors may receive, as at least a portion of an input, one or more of the transformed units. The query constructors may include one or more operators, such as those for translation, intersection, and union operations, to generate the queries. In at least one embodiment, dynamic switches may be utilized to control inputs to the query constructors, where input instructions, ground truth data, and the like may carry triggers to open or close the dynamic switches to prevent certain data inputs into the query constructors, or to permit certain data inputs into the query constructors. The generated queries may be used within an answer space in order to determine distances within the answer space 706. By way of example, the queries may be mapped against hyperboloids that are embedded for the units in order to determine errors with the embedding. For example, larger distances may be indicative of errors (e.g., larger distances between centers or edges of the queries compared to the centers or edges of the units). The distances calculations may lead to one or more results 710 that may be compared against ground truth data to further train or adjust various parameters of the architecture. For example, discrepancies may lead to adjustments of one or more weights applied to different components within the system in order to change how the units are embedded within the hyperbolic space.

Figure 8:
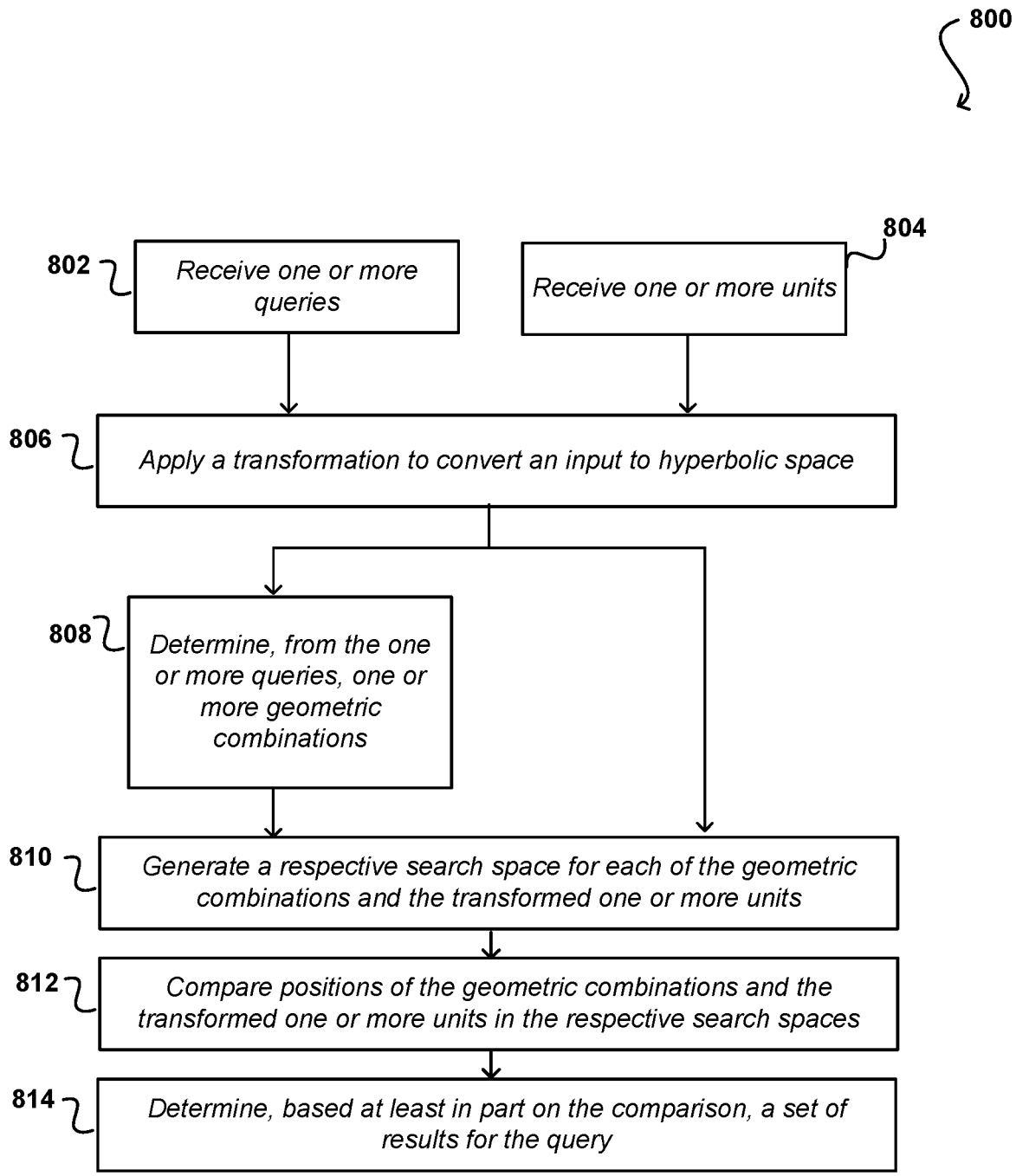
FIG. 8 illustrates an example process for processing a query through search spaces that can be utilized in accordance with various embodiments.

FIG. 8 illustrates an example process 800 for performing a search in accordance with one embodiment. In this example, one or more queries 802 are received along with one or more units 804. In various embodiments, the queries 802 relate to search queries, such as those submitted by a user searching through some type of organized data structure. In at least one embodiment, the one or more units correspond to products within a catalog or some type of data with hierarchical structure. The inputs are both transformed to hyperbolic space 806. By way of example, both the queries and the units may be represented with Euclidean coordinates prior to the transformation. The transformation mains the relationships between various components, but may provide more precision with grouping due to the dynamic shapes of hyperboloids as opposed to rigid Euclidean structures often used with categorization. It should be appreciated that, in certain embodiments, one or more portions may be conducted in an offline mode, for example to initially generate product embeddings and/or to prepare search results for common or repeated searches.

In at least one embodiment, one or more geometric combinations are determined for the one or more queries 808. The geometric combinations may relate to query entities, such as trigrams or the like, as well as combinations of trigrams, such as pairs of different trigrams. Respective search spaces may be generated for the one or more queries and for the one or more units 810. For example, each of the search spaces may include hyperboloids embedded within a hyperbolic space, where a position corresponds to one or more features of the query and/or unit. Responsive to a command to conduct a search, the search space for the one or more queries may be compared to the search space for the one or more units 812. As an example, distances between features, such as centers or edges of different hyperboloids, may be computed and evaluated, where shorter distances would suggest higher correlations. Accordingly, search results may be developed based on the comparison 814.

Figure 9:
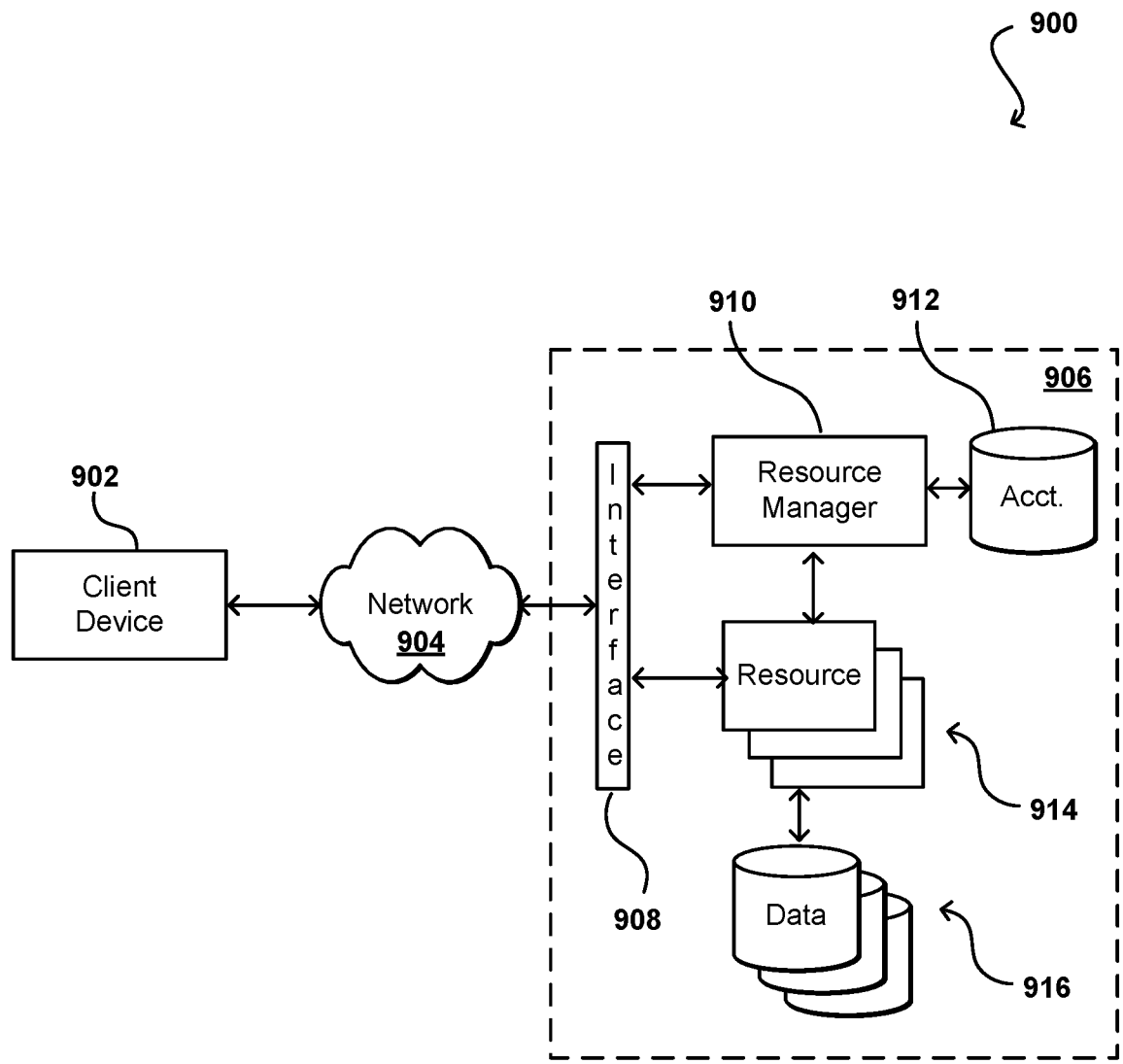
FIG. 9 illustrates an example environment in which various embodiments can be implemented.

FIG. 9 illustrates an example environment 900 in which aspects of the various embodiments can be implemented. In this example a user is able to utilize a client device 902 to submit requests across at least one network 904 to a multi-tenant resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 904 can include any appropriate network, including an intranet, the Internet, a cellular network, a local area network (LAN), or any other such network or combination, and communication over the network can be enabled via wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 914 of one or more types. These types can include, for example, application servers operable to process instructions provided by a user or database servers operable to process data stored in one or more data stores 916 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 908 in this example can also include other components as well, such as at least one Web server, routing components, load balancers, and the like. When a request to provision a resource is received to the interface layer 908, information for the request can be directed to a resource manager 910 or other such system, service, or component configured to manage user accounts and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 912 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes.

The resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 10:
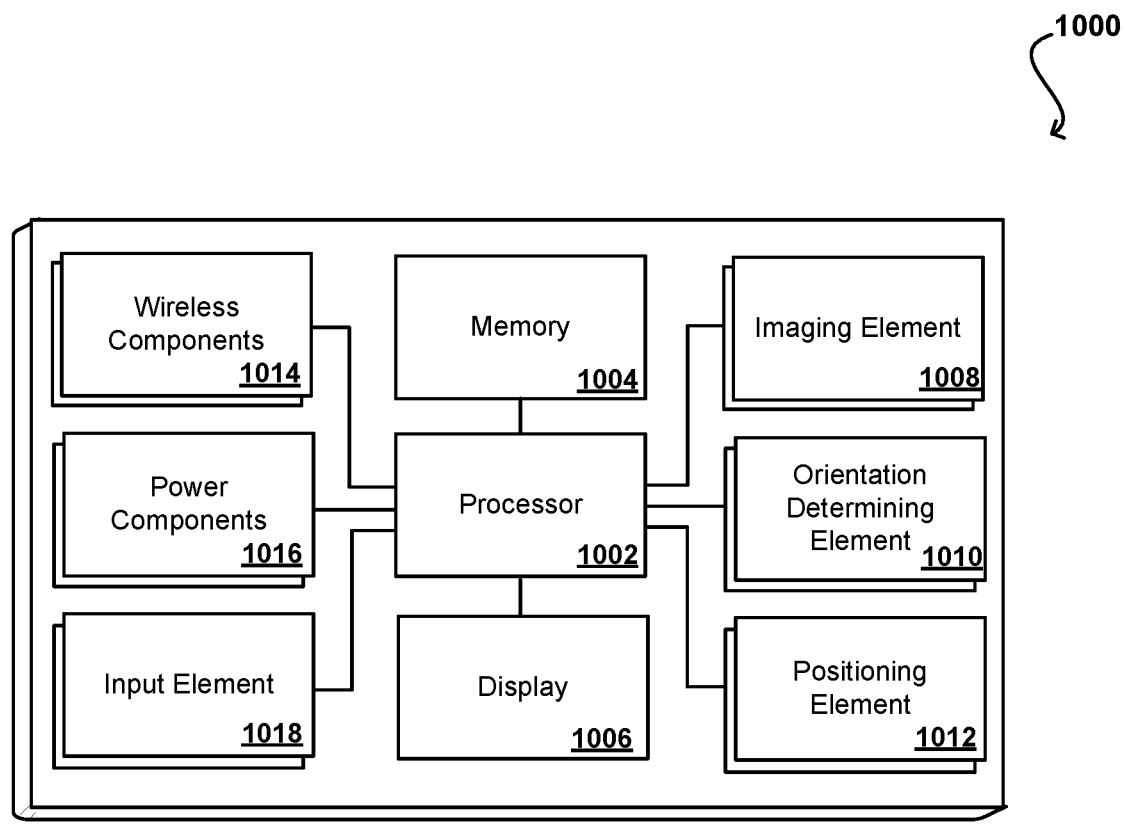
FIG. 10 illustrates example components of a computing device that can be used to implement aspects of the various embodiments.

FIG. 10 illustrates a set of basic components of an electronic computing device 1000 that can be utilized to implement aspects of the various embodiments. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices. The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C #or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a query;
   transforming Euclidean coordinates for the query to a hyperbolic space, the transformed Euclidean coordinates corresponding to a query hyperboloid within the hyperbolic space;
   generating one or more geometric combinations associated with the query hyperboloid;
   comparing a distance of the one or more geometric combinations within the hyperbolic space to relative positions of one or more product hyperboloids, the one or more product hyperboloids corresponding to units stored within an index with a hierarchical structure;
   determining, based at least in part on the distance, a set of search results; and
   providing, responsive to the query, the set of search results.

2. The computer-implemented method of claim 1, further comprising:
   receiving one or more units from the index;
   transforming the one or more units into respective product hyperboloids; and
   mapping the respective product hyperboloids to the hyperbolic space.

3. The computer-implemented method of claim 2, further comprising:
   generating, based at least in part on the one or more transformed units, a traversal query;
   traversing the index, using the traversal query;
   determining a test distance between the respective product hyperboloids and the traversal query; and
   comparing the test distance to ground truth data.

4. The computer-implemented method of claim 1, wherein the geometric combinations include at least one of a trigram or a pair of trigrams.

5. The computer-implemented method of claim 1, further comprising:
   embedding the product hyperboloids within the hyperbolic space; and
   determining a structural relationship associated with the units in Euclidean geometry is maintained in the hyperbolic space.

6. A computer-implemented method, comprising:
   receiving one or more units corresponding to items within a hierarchical index;
   transforming the one or more units from a Euclidean space to a hyperbolic space, the transformed coordinates for the one or more units including respective centers and limits;
   embedding the one or more units, as respective hyperboloids, into an answer space; and
   verifying, using at least one trained machine learning system, respective positions of the respective hyperboloids in the answer space.

7. The computer-implemented method of claim 6, further comprising:
   generating, using at least a portion of the respective centers and limits, a constructed query set; and
   evaluating the constructed query set within the answer space, the evaluation determining respective distances between the constructed query set and the respective hyperboloids within the answer space.

8. The computer-implemented method of claim 7, further comprising:
   determining a ranked answer set, based at least in part on the evaluating; and
   comparing the ranked answer set to ground truth data.

9. The computer-implemented method of claim 7, further comprising:
   performing an operation on the respective centers and limits, the operation including at least one of a translation, an intersection, or a union.

10. The computer-implemented method of claim 6, further comprising:
    receiving a search query;
    converting the search query to the hyperbolic space;
    mapping the search query to the answer space; and
    returning a set of query search results.

11. The computer-implemented method of claim 6, wherein the respective hyperboloids maintain structural relationships from the hierarchical index.

12. The computer-implemented method of claim 6, further comprising:
    receiving an operator signal corresponding to at least instructions for a position of a switch, the switch permitting or blocking information transmission to one or more modules.

13. The computer-implemented method of claim 6, further comprising:
    receiving a search query;
    converting the search query to the hyperbolic space;
    determining, for the converted search query, at least one of a query entity or a geometric combination;
    executing the at least one query entity or the geometric combination against the answer space; and
    returning a set of query search results.

14. The computer-implemented method of claim 13, further comprising:
    determining a user intent for the search query, based at least in part on an intersection operation.

15. A cross-inventory product search system, comprising:
    at least one processor; and
    memory including instructions that, when executed by the at least one processor, cause the system to:
       receive one or more units corresponding to items within a hierarchical index;
       transform the one or more units from a Euclidean space to a hyperbolic space, the transformed coordinates for the one or more units including respective centers and limits;
       embed the one or more units, as respective hyperboloids, into an answer space; and
       verify, using at least one trained machine learning system, respective positions of the respective hyperboloids in the answer space.

16. The cross-inventory product search system of claim 15, wherein the instructions when executed further cause the system to:

generate, using at least a portion of the respective centers and limits, a constructed query set; and evaluate the constructed query set within the answer space, the evaluation determining respective distances between the constructed query set and the respective hyperboloids within the answer space.

17. The cross-inventory product search system of claim 15, wherein the instructions when executed further cause the system to:

determine a ranked answer set, based at least in part on the evaluating; and compare the ranked answer set to ground truth data.

18. The cross-inventory product search system of claim 15, wherein the instructions when executed further cause the system to:

perform an operation on the respective centers and limits, the operation including at least one of a translation, an intersection, or a union.

19. The cross-inventory product search system of claim 15, wherein the respective hyperboloids maintain structural relationships from the hierarchical index.

20. The cross-inventory product search system of claim 15, wherein the instructions when executed further cause the system to:

receive a search query;

convert the search query to the hyperbolic space;

determine, for the converted search query, at least one of a query entity or a geometric combination;

execute the at least one query entity or the geometric combination against the answer space; and return a set of query search results.

\* \* \* \* \*